United States Patent
Roe

(10) Patent No.: US 12,084,615 B2
(45) Date of Patent: Sep. 10, 2024

(54) CHEMICAL COMPOSITIONS AND IN-SITU METHODS OF USING SAME FOR REMEDIATING SULFUR-CONTAINING COMPOSITIONS AND OTHER CONTAMINANTS IN FLUIDS BEING EXTRACTED FROM THE EARTH

(71) Applicant: GAPS Technology, LLC, Slidell, LA (US)

(72) Inventor: Cliffton Lee Roe, Harrison Township, MI (US)

(73) Assignee: Gaps Technology, LLC., Slidell, LA (US)

( * ) Notice: Subject to any disclaimer, the term of this patent is extended or adjusted under 35 U.S.C. 154(b) by 155 days.

(21) Appl. No.: 17/943,793

(22) Filed: Sep. 13, 2022

(65) Prior Publication Data
US 2023/0102592 A1 Mar. 30, 2023

Related U.S. Application Data

(60) Provisional application No. 63/243,412, filed on Sep. 13, 2021.

(51) Int. Cl.
*C09K 8/03* (2006.01)
*C09K 8/532* (2006.01)
*C10G 27/10* (2006.01)
*C10G 29/00* (2006.01)

(52) U.S. Cl.
CPC ........... *C09K 8/532* (2013.01); *C09K 8/03* (2013.01); *C10G 27/10* (2013.01); *C10G 29/00* (2013.01); *C09K 2208/20* (2013.01); *C10G 2300/1033* (2013.01); *C10G 2300/4037* (2013.01)

(58) Field of Classification Search
None
See application file for complete search history.

(56) References Cited

U.S. PATENT DOCUMENTS

| | | |
|---|---|---|
| 8,562,820 B2 | 10/2013 | Gatlin |
| 10,913,911 B1 | 2/2021 | Roe |
| 2003/0166472 A1 * | 9/2003 | Pursley ............. C09K 8/82 507/200 |
| 2010/0056404 A1 * | 3/2010 | Talley ............. C10L 3/102 507/239 |
| 2010/0163255 A1 * | 7/2010 | Horton ............. C09K 8/52 166/403 |
| 2017/0335204 A1 * | 11/2017 | Ekoue-Kovi ....... C10G 29/20 |
| 2019/0153332 A1 * | 5/2019 | Roe .................. C02F 1/50 |
| 2019/0322951 A1 * | 10/2019 | Roe .................. C02F 1/50 |
| 2020/0239789 A1 * | 7/2020 | Roe .................. C02F 1/50 |
| 2021/0230487 A1 | 7/2021 | Roe et al. |

FOREIGN PATENT DOCUMENTS

| | | | |
|---|---|---|---|
| WO | WO-2014085559 A1 * | 6/2014 | ........ B01D 53/1425 |
| WO | 2019/036731 A2 | 2/2019 | |
| WO | 2019/209379 A1 | 10/2019 | |

OTHER PUBLICATIONS

Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.

* cited by examiner

*Primary Examiner* — Robert S Loewe
(74) *Attorney, Agent, or Firm* — Carrier, Shende & Associates P.C.; Joseph P. Carrier; Fulchand P. Shende

(57) ABSTRACT

A treatment method for remediating various contaminants including $H_2S$, $CO_2$, $NH_3$ and other contaminants contained in fluids being extracted from the earth comprises steps of: preparing an aqueous based treatment composition containing water and collectively 35-55 weight percent of one or more hydroxide compounds; injecting a dosage amount of the treatment composition into contaminated fluids located in a subterranean deposit under the earth's surface such that the treatment composition mixes with the fluids deep under the earth's surface; and extracting a mixture of the contaminated fluids and the treatment composition through a well such that the treatment compositions remediates contaminants in the fluids as the mixture passes through the well to the earth's surface, wherein a dosage amount of the treatment composition may be 0.010 to 10.0 ml of the aqueous based treatment composition/liter of the contaminated fluids being extracted from the subterranean deposit.

15 Claims, No Drawings

CHEMICAL COMPOSITIONS AND IN-SITU METHODS OF USING SAME FOR REMEDIATING SULFUR-CONTAINING COMPOSITIONS AND OTHER CONTAMINANTS IN FLUIDS BEING EXTRACTED FROM THE EARTH

CROSS-REFERENCE TO RELATED APPLICATIONS

This application claims priority to U.S. Provisional Application Ser. No. 63/243,412, filed Sep. 13, 2021. The entire subject matter of this priority application is incorporated by reference herein.

BACKGROUND OF THE INVENTION

1. Field of the Invention

The present disclosure relates to a revolutionary and highly effective and efficient treatment compositions and in-situ treatment methods for remediating various contaminants including $H_2S$, $CO_2$, $NH_3$ etc. contained in fluids being extracted from the earth. More particularly, the present disclosure relates to such treatment compositions and in-situ treatment methods in which the treatment compositions are pumped down hole deep into the earth through a pipe associated with a well so that the treatment compositions mix with the fluids that are being or to be extracted from the earth through the well and efficiently remediate the contaminants in the fluids as the fluids are being extracted from the earth through the well, and whereby almost all of the $H_2S$, $NH_3$ and other contaminants in the fluids being extracted are remediated down to very low, safe levels by the time the extracted fluids are brought to the earth's surface through the well.

2. Background

Sulfur-containing compounds including hydrogen sulfide ($H_2S$) have long been recognized as undesirable contaminants in various fluids including hydrocarbon or petroleum based liquids such as crude oil, gasses including natural gas, contaminated aqueous solutions extracted from the earth along with crude oil and natural gas, etc. Herein "hydrocarbon based liquid" is used to indicate any hydrocarbon based liquid, including petroleum based liquids. While essentially all hydrocarbon based liquids may be effectively and efficiently treated with the treatment compositions and treatment methods of the present invention, some examples of hydrocarbon based liquids which may be include essentially all those containing molecules of $CH_9$ to $CH_{32}$. $H_2S$ is a particularly undesirable contaminant because it is highly toxic, corrosive, etc. and generally petroleum based liquids such as crude oil should contain less than five ppm $H_2S$ in order to be acceptable for refining or other processing. While the amount of $H_2S$ in hydrocarbon based liquids and natural gas can range from a few ppm to more than 100,000 ppm, crude oil from the ground typically contains ≤40,000 ppm $H_2S$, most often ≤2000 ppm $H_2S$, and the amount in natural gas is generally much higher. These fluids will generally be somewhat acidic with a pH about 5 to 6. The $H_2S$ may be present in several forms, including $H_2S$ dissolved in a liquid, $H_2S$ as mercaptan sulfur and $H_2S$ content in vapor or gaseous form, but the majority is typically present as $H_2S$ content in vapor or gaseous form for fluids at atmospheric pressure and temperature, particularly at higher concentrations, and the release of $H_2S$ in vapor or gaseous form is particularly toxic and dangerous to humans and other animals. $H_2S$ gas has greater solubility in hydrocarbon based liquids than in water, and at the high pressures at which crude oil exists underground, e.g., 1500 psi to 3000 psi at a well depth of 10,000 feet, it is possible for the crude oil to have thousands and tens of thousands of ppm $H_2S$ therein.

Ammonia ($NH_3$) and carbon dioxide ($CO_2$) are other significant contaminants besides sulfur containing compounds that are commonly contained in the fluids extracted from the earth, including crude oil and natural gas. The $H_2S$, $NH_3$ and $CO_2$ and other contaminants are dissolved and fully contained in crude oil and other associated liquids when underground at very high pressures, e.g., 1500 psi to 3000 psi at a well depth of 10,000 feet, but many of these contaminants are released from such contaminated liquids in gaseous form and together with the natural gas being extracted from the well collectively form a "sour gas" as the liquids rise to the earth's surface through a well and the pressure of the fluids is reduced to atmospheric pressure, consistent with Henry's Law. The amount of soluble and gaseous $H_2S$ which can be in aqueous solutions is less than the amount which may be in hydrocarbon based liquids, but it still can be present in hundreds and thousands of ppm, and contaminated aqueous solutions will typically contains ≤1000 ppm $H_2S$. Generally, $H_2S$ is an acidic compound, while crude oil as extracted from the ground and containing a typical amount of $H_2S$, e.g. ≤2000 ppm, some of which my remain in the form gas dissolved in the crude oil, has a moderately acidic pH of about 5-5.5. Gaseous $H_2S$ does not exist in solution above a pH of about 7. Similarly, $NH_3$ is converted to $NH_4$, at a pH of 7 or higher.

There are many known treatment compositions and treatment methods for remediating $H_2S$, $NH_3$, $CO_2$ and other contaminants in fluids such as crude oil, natural gas and the aqueous solutions extracted from the earth along with these fluids, including treatment compositions and treatment methods previously proposed by the present inventor. These known treatment methods generally involve treating the fluids after they are extracted from the wells, e.g., the known treatment methods will typically involve adding the treatment compositions to or otherwise contacting the contaminated fluids with the treatment compositions after the fluids are extracted from the earth so that the treatment compositions will contact and react with the contaminants in the fluids to remediate them down to acceptable levels.

M. N. Sharak et al., *Removal of Hydrogen Sulfide from Hydrocarbon Liquids Using a Caustic Solution*, Energy Sources, Part A: Recovery, Utilization, and Environmental Effects, 37:791-798, 2015, discusses some conventional treatment compositions and treatment processes that have been used for remediating H2S and other contaminants in hydrocarbon liquids such as crude oil. For example, the article discusses that: the known methods include an amine process involving monoethanolamine (MEA), triazine, etc., treatment involving use of caustic material, iron oxide process, zinc oxide, molecular sieve, potassium hydroxide, and a hydrodesulphurization process; the amine treatment is usually the most cost effective choice for gas sweetening when significant amounts of acid gases exist; scrubbing of hydrogen sulfide using sodium hydroxide solution is a well established technology in refinery applications; caustic wash process is commonly used as a pre-step in all liquid hydrocarbons sweetening; and since the used solvent in this process cannot be easily regenerated, caustic scrubbers are most often applied where low acid gas ($H_2S$) volumes must be treated.

H$_2$S abatement achieved by a conventional amine treatment process uses an amine such as monoethanolamine (MEA) or triazine for treating H$_2$S in crude oil. See, for example, U.S. Pat. No. 8,562,820 which discloses a formulation of triazine which is specially suited for treatment of hydrocarbon liquids for remediating the H$_2$S and other sulfur containing compounds therein. However, the conventional amine treatment process may not be effective for remediating H$_2$S in crude oil containing paraffin and other waxes and in oil containing more than 200 ppm H$_2$S. Further, the conventional triazine treatment for H$_2$S generally requires a significant amount of triazine for treating H$_2$S, e.g., the required amount of triazine may be 10 times the amount of H$_2$S in the contaminated liquid, and hence results in a relatively high treatment cost. Also, while the H$_2$S may be initially remediated or abated down to acceptable levels, the sulfur contained in the treated oil may undesirably revert back to H$_2$S over time, especially if the treated oil is heated. Somewhat similarly, it is also known that there are bacteria which ingest sulfur compounds, and hence may reduce the amounts of sulfur contaminants in hydrocarbon based liquids or contaminated aqueous solutions. However, when the bacteria die and decompose this undesirably releases the sulfur back into the hydrocarbon based liquids or contaminated aqueous solutions.

Some of the present inventor's previously proposed treatment compositions and methods for remediating H$_2$S, CO$_2$, NH$_3$ and other contaminants in various contaminated fluids such as crude oil, natural gas and aqueous solutions such as solutions extracted from the earth along with crude oil are disclosed in International Application Nos. PCT/US2018/050913 and PCT/US2018/064015, U.S. Pat. No. 10,913,911 and US Patent Application Publication No. 2021-0230487-A1, the entire contents of which are incorporated herein by reference. These prior proposals are very effective at quickly remediating H$_2$S in contaminated fluids, even at very high concentrations, e.g., 100,000 ppm or more.

The prior proposals as set forth in PCT/US2018/050913 involves an aqueous treatment composition containing primarily a high concentration of one or more hydroxide compounds, wherein the hydroxide compound(s) collectively account for 35-55 weight percent, and preferably at least 45 weight percent of the treatment solution, which efficiently react with H$_2$S to convert it to non-toxic substances. Most hydroxide compounds may be used in the treatment composition, including such as sodium hydroxide (NaOH), potassium hydroxide (KOH), lithium hydroxide (LiOH), magnesium hydroxide (Mg(OH)$_2$), and manganese hydroxide (Mn(OH)$_2$, Mn(OH)$_4$) etc., although in terms of lower cost NaOH and KOH are preferred. Also, depending on what fluid is being remediated and what contaminants are contained therein some of the hydroxide compounds may be less desirable, e.g., for treating natural gas containing salts as well as H$_2$S, NaOH would be less desirable because it adds more Na to the natural gas beyond the Na contained in the salts and may complicate the remediation of H$_2$S and other contaminants in the natural gas. Such treatment composition according to the recent proposal is highly alkaline with a pH of 14. In the previously proposed treatment process a relatively small dosage of the treatment solution is added to the hydrocarbon based liquids or aqueous solutions being treated, e.g., at a standard dosage rate of 0.25-6.0 ml of the treatment solution/liter of the liquid being treated, preferably 1.0-5.0 ml of the treatment solution/liter of the liquid being treated, which corresponds to approximately 125-3000 ppm of hydroxide(s) in the liquid being treated. A particularly appropriate dosage rate depends on multiple factors, and the hydroxide(s) in the solution efficiently remediate the H$_2$S and other sulfur-containing compounds down to acceptable levels within relatively short time periods such as 15 minutes to a few hours, and without otherwise detrimentally affecting the hydrocarbon-petroleum based liquids or contaminated aqueous solutions in any significant manner. The proposed treatment solution may further include one or more other components depending on the specific characteristics of the liquids being treated and other factors relating to the remediation treatment process. For example, the treatment solution may include a silicate such as potassium silicate (K$_2$SiO$_3$) or barium (Ba) as an antibacterial agent, but the high concentration of hydroxide(s) in the treatment solution is a primary characteristic of the solution because this is important for efficient remediation of H$_2$S by the hydroxide(s) in the liquids being treated, and the high hydroxide concentration also helps to kill bacteria.

Another of the inventor's previous proposals as set forth in PCT/US2018/064015 involves use of the treatment liquid substantially according to the first proposal together with an appropriate amount of one or more organic acids such as fulvic acid and humic acid, which function to assure that no or substantially no precipitates, scale or the like are released from the remediated liquids. A dosage rate of the organic acid(s) is one that will typically result in a concentration of the organic acid(s) in the liquid being treated being in a normal range of 0.01-10 ppm, preferably 0.1-3 ppm, whether the liquid is a hydrocarbon based liquid or contaminated aqueous solution. Typically, the organic acid(s) will be combined with the treatment composition as disclosed in PCT/US2018/050913 and then an appropriate dosage of the treatment composition including the organic acid(s) is added to the contaminated liquid as discussed in PCT/US2018/064015. The organic acids may be added in powdered form or in the form of an aqueous solution containing 1-40 wt % of the organic acid(s), and such that the organic acid(s) may constitute 0.1-2% wt of the treatment composition. A small amount of monoethanolamine or MEA (C$_2$H$_7$NO) may also be included in the treatment composition to help prevent scale formation from the remediated liquids, e.g., an amount corresponding to a concentration of 0.5-15 ppm, and preferably 1.0-10 ppm, of the MEA in the hydrocarbon based liquid or aqueous solution being treated. The organic acid(s) such as fulvic acid and humic acid are effective to bind to the remediated contaminants and maintain them in the treated liquids without forming any precipitates while they are being treated, transported and/or stored for a period of time such as hours, days or weeks, which is very important sometimes, while MEA may also help to prevent scale formation from the remediated liquids.

Fulvic acid is actually a family of organic acids, but may typically be identified as 1H,3H-Pyrano[4,3-b][1]benzopyran-9-carboxylic acid, 4,10-dihydro-3,7,8-trihydroxy-3-methyl-10-oxo-; 3,7,8-trihydroxy-3-methyl-10-oxo-1,4-dihydropyrano[4,3-b]chromene-9-carboxylic acid, with an average chemical formula of C$_{135}$H$_{182}$O$_{95}$N$_5$S$_2$ and molecular weights typically in a range of 100 to 10,000 g/mol. Somewhat similarly, humic acid is a mixture of several molecules, some of which are based on a motif of aromatic nuclei with phenolic and carboxylic substituents, linked together, and the illustration below shows a typical structure. Molecular weight (size) of humic acid is typically much larger than that of fulvic acid, and can vary from 50,000 to more than 500,000 g/mol.

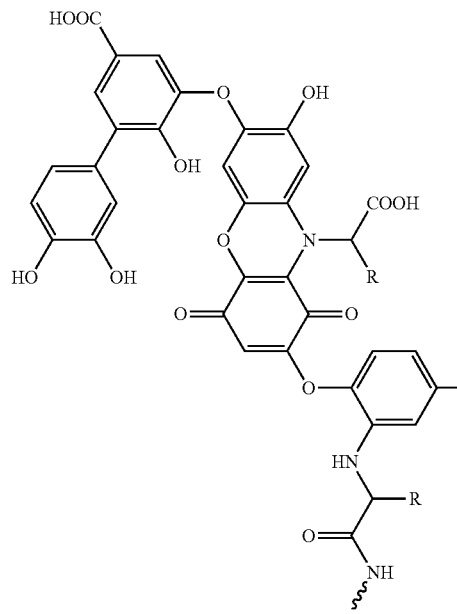
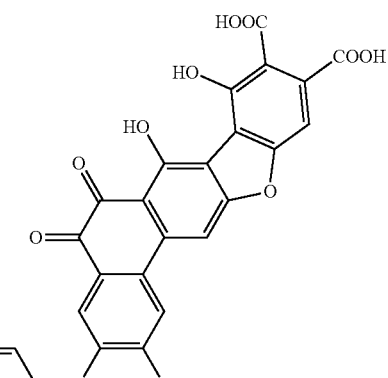

The treatment compositions previously proposed by the inventor may further include a small amount, e.g., 0.5-4 wt %, of a chelating agent such as ethylenediaminetetraacetic acid (EDTA), which among other things increases the efficiency of hydroxide compounds in remediating $H_2S$, and smaller amounts of a surfactant such as sodium lauryl sulphate and a buffering agent such as potassium carbonate or phosphoric acid ($H_3PO_4$), etc. The treatment compositions disclosed in PCT/US2018/050913 and PCT/US2018/064015 can be very conveniently be used for treating contaminated liquids by simply adding appropriate mounts of the compositions to the contaminated liquids, and in a relatively short time, e.g., 15 minutes to two hours, the treatment compositions will remediate $H_2S$ and other contaminants down to safe levels. However, a desirable characteristic of the previously proposed treatment compositions and methods is that even if an excessively large dosage of one of the treatment compositions is added to a contaminated liquid such as crude oil for any reason, e.g., uncertainty about the exact composition of the crude oil being extracted from a well at any given time, generally any excess treatment composition remaining in the treated oil will not detrimentally affect the oil as discussed in PCT/US2018/050913 and PCT/US2018/064015. The inventor's previously proposed treatment methods have proven to be commercially successful based on their effectiveness and efficiency in remediating $H_2S$, $CO_2$, $NH_3$ and other contaminants in various contaminated fluids and without creating any problems or disadvantages for the treated liquids.

Treating $H_2S$ and other contaminants in gasses including natural gas is much more complicated and challenging that treating such contaminants in liquids such as crude oil for various reasons as discussed in U.S. Pat. No. 10,913,911 and US Patent Application Publication No. 2021-0230487-A1. The complications include being able to sufficiently contact the contaminants which are contained in the contaminated gasses with the treatment compositions which are generally aqueous based and in liquid form, complications caused by the presence of other contaminants such as water and salts in the gasses, etc. These complications make it very difficult to sufficiently remediate the contaminants in the gasses down to safe, acceptable levels in an efficient and cost effective manner. Unless the treatment method is cost effective, it is not likely to be used on a large or commercial scale. According to the inventor's previously proposed gas treatment methods, some of the contaminants in the gasses, including water and salts, are initially removed through preliminary treatments of the gasses, such as a water wash to remove salts and other water-soluble contaminants, dehydration to remove water, etc., and then $H_2S$, $CO_2$, $NH_3$ and other particularly toxic and/or undesirable components still remaining in the pre-treated gasses are remediated using the inventor's previously proposed treatment compositions, including those discussed above.

While the inventor's previously proposed treatment compositions and treatment methods are efficient and effective for remediating $H_2S$, $CO_2$, $NH_3$ and other contaminants in the contaminated fluids, and are much more effective and efficient than other conventionally known treatment compositions and methods known prior to the inventor's proposals, the present inventor's previously proposed treatment compositions and methods still remain to be improved on in terms of efficiency and cost effectiveness. In other words, there still remains a desideratum in the art for treatment compositions and treatment methods that can more efficiently, cost-effectively and safely remove or otherwise remediate $H_2S$, $CO_2$, $NH_3$ and other contaminants in contaminated fluids, including crude oil, natural gas and contaminated aqueous solutions extracted from the earth along with crude oil and natural gas, down to safe, acceptable levels.

SUMMARY AND DISCLOSURE OF THE INVENTION

An object of the present invention is to satisfy the discussed need.

The present inventor has carefully studied the problems and limitations associated with known treatment compositions and treatment methods for remediating $H_2S$, $CO_2$, $NH_3$ and other contaminants in various fluids, including fluids extracted from the earth, and has conceived of a revolutionary new treatment method using the inventor's previously proposed treatment compositions and variations thereof. The new treatment method is far more effective, efficient and cost effective for remediating $H_2S$, $CO_2$, $NH_3$ and other contaminants in various fluids being extracted from the earth in comparison to any conventional treatment compositions and treatment methods known at the time of the present invention. Particularly, the present inventor has discovered that the aqueous based treatment compositions he previously proposed, as well as variations thereof, may be very efficiently and effectively used for remediating $H_2S$, $CO_2$, $NH_3$ and other contaminants in various fluids being extracted from the earth via an in-situ treatment method which involves pumping appropriate dosages of the treatment compositions deep down into the earth where deposits of the fluids are located and being extracted such that the treatment compositions will mix with the fluids and react with the contaminants in the fluids to fully or substantially remediate the $H_2S$, $CO_2$, $NH_3$ and other contaminants in the fluids as the fluids are being extracted from the earth up through a well. Essentially, the new treatment method involves extremely efficient in-situ treatment of the contaminated fluids in-situ or down hole in the earth while the contaminated fluids are naturally combined together in liquid form under high pressure and high temperature, and before the fluids are fully extracted from the earth and are separated from each other. e.g., into a hydrocarbon liquid fraction, an aqueous liquid fraction and a gaseous fraction. This is something that has never been done before to the inventor's knowledge. As will be understood, the present treatment method makes effective use of the natural, subterranean conditions and the time it takes for the contaminated fluids to be moved to the earth's surface as aspects of the treatment method to achieve greatly enhanced efficiency and cost effectiveness at remediating the contaminants in the contaminated fluids using the inventor's treatment compositions.

DETAILED DESCRIPTION OF PRESENT EXEMPLARY EMBODIMENTS

Exemplary embodiments of the present invention will be described below. Primary aspects of the present invention include novel d treatment compositions and treatment processes wherein the treatment compositions are injected down hole into subterranean deposits of crude oil and natural gas for remediating contaminants contained in these fluids as they are being extracted from the earth.

Treatment Compositions

Crude oil, natural gas and contaminated aqueous solutions are all intimately combined together in a liquid emulsion in the deposits where the deposits are located deep in the earth due to the high pressures and high temperatures. e.g., 1500 psi to 3000 psi at a well depth of 5,000 to 10,000 feet and 250-400° F., existing at the subterranean locations of the deposits. Such deposits may be one mile, two miles or more below the earth's surface. As the liquid emulsion of such fluids is extracted from the earth though a well the pressure and temperature of the emulsion are gradually reduced, e.g., at the earth's surface the pressure may be atmospheric pressure or somewhat above atmospheric pressure and temperature may be 80 to 140° F. and as the emulsion approaches the earth's surface the emulsion tends to separate into the different components of crude oil, natural gas and contaminated aqueous solution, rather than staying as an emulsion. In relation to this, most oil wells include a choke in well pipe through which the fluids are extracted, which choke is located relatively close to the outlet end of the well pipe and significantly reduces the inner diameter of the well pipe. The fluid pressure in the well pipe upstream of the choke is still much higher than atmospheric pressure so that the fluids remain in the form of the liquid emulsion, but after passing through the choke the pressure is significantly reduced due to what is known as the venturi effect. The treatment method according to the present invention further makes efficient use of this venturi effect, e.g., the significant pressure reduction of the venturi effect causes the treatment compositions to more intimately contact and be absorbed into the different contaminated fluids of the emulsion. This more intimate contact and absorption helps to increase efficiency of remediation of any contaminants remaining in the fluids downstream of the choke. Based on the pressure reduction after passing through the choke the liquid emulsion tends to separate into different liquid and gaseous fractions, and once extracted from the well, these fractions may be readily separated from each other using an appropriate separator, with the natural gas in a gaseous form and the other components in liquid forms.

According to a first embodiment of the present invention, a treatment method for remediating various contaminants including $H_2S$, $CO_2$, $NH_3$ etc. contained in fluids being extracted from the earth comprises steps of: preparing an aqueous based treatment composition containing water and collectively 35-55 weight percent of one or more hydroxide compounds; injecting a dosage amount of the treatment composition into fluids located deep under the earth's surface such that the treatment composition mixes with the fluids deep under the earth's surface; and extracting a mixture of the fluids and the treatment composition through a well such that the treatment compositions remediates contaminants in the fluids as the mixture passes through the well to the earth's surface.

Essentially all hydroxide compounds may be used in the treatment composition, including such as sodium hydroxide (NaOH), potassium hydroxide (KOH), lithium hydroxide (LiOH), magnesium hydroxide ($Mg(OH)_2$), and manganese hydroxide ($Mn(OH)_2$, $Mn(OH)_4$) etc., although in terms of lower cost NaOH and KOH are preferred. Even though the liquid emulsion may contain salts including NaCl as contaminants, use of NaOH may not cause any problem for the present method, as it may with the inventor's previously proposed treatment methods for remediating contaminants in natural gas, because the natural gas is under great pressure in the emulsion with the other fluids.

The dosage amount of the treatment composition may be 0.010 to—10.0 ml of the treatment composition/liter of the contaminated fluids being extracted from a given subterranean deposit, which are naturally combined as an emulsion at the subterranean temperatures and pressures, which corresponds to 1 to 10,000 ppm of the treatment composition in the extracted fluids. For example, for a well which outputs 4000-5000 barrels of oil, 30,000-40,000 barrels of contaminated aqueous solution (so-called "produced water"), and 1-3 million $ft^3$ of natural gas/day, a dosage amount of the treatment composition in the treatment method of the present invention may be 1000 to 5000 gallons of the treatment composition/day, and this amount may be added continuously or periodically over a 24 hour period.

When the emulsion and the treatment composition are initially mixed together the mixture of the fluids and the treatment composition may have a pH in a range of 9.0 to less than 10.00, and preferably 9.5 or less, even in localized pocket(s) where the treatment composition is injected to avoid separation and release/precipitation of salts any other materials such as dissolved and suspended solids from the mixture as it is being extracted from the earth because these materials may tend to clog the well pipe through which the mixture is extracted over time. Also, it is important so that the liquid emulsion maintains hydraulic consistency while being extracted. Once the mixture is extracted from the earth it may have a pH in a range of 7 to 7.2 because much of the will have reacted with the $H_2S$, $CO_2$, $NH_3$ and other contaminants. Based on experiments performed by the inventor, the reactions between the treatment composition and the contaminants occurs very promptly within the first 15-60 seconds after the treatment composition and liquid emulsion are mixed together at the subterranean conditions. At pH of 7.0 to 7.2 $H_2S$ does not exist in gaseous form, e.g., at pH of 6.9 and above a molecule of $H_2S$ loses a valence electron going from $H^+$ to $H^-$ and is no longer such sulfide, while $NH_3$ is converted to $NH_4$ in such pH range.

In the injecting step of the treatment method according to the first aspect of the present invention, the treatment composition may be injected using a capillary-tubing injection system. Such systems may be commercially purchased, and are known to inject various liquid chemicals down into a well to address various problems experienced with wells, e.g., paraffin wax buildup and salt buildup at various parts of a well pipe, corrosion and scale of the well pipe, etc. However, such systems have never been used as part of a treatment method involving injection of relatively large quantities of treatment compositions that fully remediate most or all of the toxic contaminants in fluids such as crude oil and natural gas as these fluids are being extracted from the earth as in the treatment method according to the present invention. Also, the injection of the treatment composition may occur continuously or periodically at one or more locations associated with the well though which the fluids are being extracted from the earth, e.g., at or near an end entrance of a well bore deep down in the earth where the fluids enter the well pipe, at various parts of the well pipe extending through the earth, or combinations of these.

The most efficient amount of the treatment composition to be added will depend on the specific characteristics of the well, e.g., its specific output of crude oil, natural gas and produced water, the specific contaminants and amount of each contaminant in the fluids that are being extracted, etc. However, it is recognized that these characteristics may vary greatly even for a give well on a given day, and it may not be practical to continuously monitor all of the characteristics and continuously attempt to make adjustments based on the monitored characteristics. An important advantage of the treatment method according to the present invention is that an excess amount of the treatment composition may be added. e.g., 2-3 times the most efficient amount, without creating any significant problems or disadvantages for the remediated crude oil and natural gas that are extracted other than the increased cost of the additional treatment composition. Again, however, the initial pH of the mixture of liquid emulsion and the treatment composition used in the treatment method according to the present invention is an important characteristic should be in a range of 9.0 to 10.0 and pH of the treated liquid emulsion should be in a range of 7.0 to 7.2, and these characteristics are something that may be easily monitored for generally assuring that a proper dosage amount of the treatment composition is being pumped down into the earth and becoming mixed with the liquid emulsion of fluids to be extracted according to the present method.

Other components besides water and hydroxide compound(s) may be included in the treatment compositions used in the treatment methods of the present invention, including other components included in the inventor's previously proposed in treatment compositions as discussed in PCT/US2018/050913 and PCT/US2018/06401 U.S. Pat. No. 10,913,911 and US Patent Application Publication No. 2021-0230487-A1. The other components may be included in smaller and much smaller amounts than the hydroxide compound(s), which are most important for quickly and efficiently remediating targeted contaminants including $H_2S$, $CO_2$, $NH_3$ etc. in the fluids being treated. For example, 0.01-5 wt % of organic acids such as fulvic acid and humic acid 0.05-2 wt % of MEA may also be included in the aqueous based treatment composition because these are helpful for preventing formation and release of precipitates and scale from the treated fluids. Also, the treatment composition according to the present invention may include a small amount, e.g., 0.5-4.0 wt of a chelating agent such as EDTA, which among other things increases the efficiency of hydroxide compounds in remediating $H_2S$. Also, the treatment composition according to the present invention may include an antibacterial agent including silicates such as potassium silicate ($K_2SiO_3$) or barium (Ba).

Further, the treatment compositions according to the present invention may include some amount of an organic or hydrocarbon based liquid which is combined with the aqueous based treatment composition to increase the vapor pressure of the treatment composition, e.g., the mixture of the aqueous based treatment composition and the organic liquid may contain 5-40 volume % of the organic liquid. Temperatures in subterranean deposits of contaminated fluids such as crude oil, produced water and natural gas may be between 300° F. and 400° F., but when these fluids are extracted from the earth though a well, the fluids may be at a temperature of 90 to 120° F. by the time the fluids reach the earth's surface. At the high underground pressures where oil and natural gas deposits are generally located within the earth, the treatment compositions would not have much vapor pressure, but as the contaminated fluids and treatment compositions mixed therein are extracted up though a well and pressures are reduced vapor pressures of the treatment compositions will increase. Correspondingly, by including the organic liquids with the treatment compositions the compositions will have increasing vapor pressures and the vapors of the compositions will contain some amount of the hydroxide compounds in the treatment compositions, and these which will continue to react with and remediate $H_2S$ and other gaseous contaminants released from the contaminated fluids. Also, including the organic liquids in the treatment compositions which are being injected into the subterranean deposits will help to better displace the density of the oil in the subterranean deposits so that more crude oil may be extracted from any given subterranean deposit in comparison to use of the treatment compositions which do not include any organic liquids.

A wide variety of hydrocarbon based liquids may be used in the new treatment compositions, including relatively light liquid(s) including alcohols, toluene, hexane, xylene, and others, as well as mixtures of these liquids, provided that the hydroxide compound(s) and any other components to be included in the treatment compositions may be fully dissolved or dispersed into the hydrocarbon based liquids. Alcohols are appropriate for use as the hydrocarbon liquids because they are polar so that other components of the treatment composition(s) are generally dissolvable and/or miscible therein. Lighter alcohols, including methanol ($CH_3OH$), ethanol ($C_2H_5OH$), and n-propyl alcohol ($C_3H_8O$), may be more appropriate based on lower cost and/or higher vapor pressure. Toluene, hexane, xylene are also appropriate as the hydrocarbon liquids because the hydroxide compounds and other components are dissolvable or dispersible therein, as they have relatively high vapor pressures which is desirable because more of the reactive hydroxide compound(s) may be contained in the vapors where they can better react with gaseous contaminants including $H_2S$ and $CO_2$. Other hydrocarbon liquids besides alcohols, toluene, hexane, and xylene may also be used provided that the hydroxide compound(s) and other components may be dissolved or dispersed therein. Also, the hydrocarbon liquids should have higher vapor pressures than water.

Still further the treatment compositions according to the present invention may include other chemical compounds and/or catalysts helpful for other treatment(s) of the contaminated fluids being extracted, including treatments for increasing the effectiveness and efficiency of remediating contaminants in the fluids being extracted, as well as for increasing the amounts of crude oil, natural gas and/or other fluids extracted from given deposits within the earth. For example, various types of chemical oxidants in liquid or solid form may be added to the treatment compositions to help remediate contaminants and/or increase the amount of crude oil being extracted from a given well. While gaseous type chemical oxidants may also be used according to the present invention, these are not preferred as any gasses which are injected into a subterranean deposit may tend to collect together and form large size gas pockets, if that occurs there tends to be little transfer of the oxidizing gas from such pockets into the emulsion of fluids being extracted from the deposit, and hence these pockets of gasses are not particularly helpful for increasing the effectiveness or the efficiency of the treatment process. On the other hand, when the chemical oxidants in liquid and solid form are added to the treatment compositions being injected into the subterranean deposits, these do significantly transfer into the emulsion of fluids being extracted from the deposit and do help to increase the effectiveness and efficiency of remediating contaminants in the fluids being extracted, and to increase the amounts of crude oil extracted from a given well because these chemical oxidants help to displace the density of the contaminated crude oil so that more of the gaseous contaminants such as $H_2S$ and $CO_2$ are released from the crude oil and can be remediated by the hydroxide compounds(s) in the treatment compositions.

The chemical oxidants in liquid form may include any appropriate oxidizing chemical compounds that may be dissolved and/or suspended in water. These include, for example, hydrogen peroxide (H2O2), nitric acid (HNO3), sulfuric acid (H2SO4), sodium perborate ($NaBO_3 \cdot _nH_2O$), permanganate compounds ($MnO_4^-$), nitrous oxide (NO2), potassium nitrate (KNO3), sodium bismuthate ($NaBiO_3$), hypochlorite ($ClO^-$), household bleach, compounds containing halogens such as $Cl_2$ and $F_2$, etc. The chemical oxidants in liquid form may be added to the treatment composition in a range of 0.1 to 10 wt % of the total weight of the treatment compositions.

The chemical oxidants in solid form may include metals such as rhodium, platinum and palladium which function as catalysts. These may be added to the treatment composition in a range of 0.025% to 2.0 wt % of the total weight of the treatment compositions, and may be in the form of fine particles of less than 1 mm diameter. While such catalysts are typically far more expensive than the discussed liquid chemical oxidants, and hence may not be as cost efficient to use as the discussed liquid chemical oxidants. However, the solid metal particles may be recovered from the fluids that are being remediated once the fluids are extracted from a well, e.g., by filtering the extracted fluids, and the recovered metal particles can be reused to make the process more cost efficient.

It has been proposed that oxygen gas may added to water in the form of very small bubbles such as nano bubbles and the oxygen infused liquid may be pumped downhole into the earth for increasing the amounts of crude oil, natural gas and/or other fluids extracted from given deposits within the earth, based on the theory that the infused oxygen will be released from the water when it pumped downhole into a deposit. See U.S. Pat. Nos. 10,053,966 and 11,344,822. However, the present inventor does not believe that the proposed use of water infused with nano size oxygen bubbles can be pumped downhole into a subterranean deposit thousands of feet below the earth's surface due to the high temperatures which exist at such deposits. At temperatures above 100° F., it is difficult to have oxygen remain dissolved in water or other liquids no matter how high the pressure may be, consistent with Henry's Law, whereas the temperatures in subterranean deposits may be 300° F. or more. Correspondingly, if one were to try and inject water infused with oxygen gas nano bubbles down into a subterranean deposit thousands of feet below the earth's surface, much or all of the oxygen gas dissolved in the water will likely be released as gaseous oxygen from the water once it reaches the subterranean deposit and form large pockets of the oxygen such that the oxygen will not readily transfer into the emulsion of crude oil, natural gas and produced water down in the subterranean deposit as discussed herein, such that the oxygen gas would not have much effect in increasing the amount of crude oil extracted from the deposit.

Conversely, use of various types of chemical oxidants in liquid or solid form to the treatment compositions according to the exemplary embodiments of the present invention may significantly help remediate contaminants in the fluids being extracted and/or increase the amount of crude oil being extracted from a given well. While the chemical oxidants in liquid form may be significantly heated in the subterranean deposits which can experience temperatures of 300° F. or more, this would not likely cause the chemical oxidants to turn into a gas that would collect into a pocket. Rather, the high temperatures in the subterranean deposits would mostly just cause some water in the treatment compositions according to the present invention to turn into water vapor, whereas the chemical oxidant compositions would still remain in the treatment compositions and transfer into the emulsion of contaminated fluids in the subterranean deposit as the fluids are extracted from the earth.

Advantages

In-situ treatment of the contaminated fluids, including natural gas, while the fluids are combined together in a liquid emulsion and are in the process of being extracted from the earth according to the inventor's present treatment method, provides multiple significant advantages and increased efficiencies in comparison to conventional treatment methods known at the time of the present invention.

A primary and very significant advantage is that the method simultaneously remediates the contaminants in all of the fluids while all of the fluids are in liquid form and combined into the emulsion as they are being extracted from the earth using the same dosage of the treatment composition. Conversely, conventional treatment methods separately treat each of the liquids after they are separated from each other using separate dosages/amounts of the same or different treatment compositions, and possibly additional pretreatments particularly in relation to the natural gas. The simultaneous remediation of the contaminants in all of the fluids provides greater efficiency for treating the contaminants in each of the fluids, and overall provides much greater efficiency for remediating the contaminants in all of the fluids than has been previously possible. Much of the increased efficiency relates to the treatment method's use of natural subterranean conditions and the time it takes for the fluids to be extracted from the earth as aspects of the treatment method. The much greater pressures and temperatures existing at the subterranean locations where deposits of crude oil and natural gas are typically located are very beneficial to the efficiency and effectiveness of the present treatment method, not only because they maintain the fluids in a liquid emulsion, but also because the increased temperature helps the treatment composition to disperse homogeneously throughout the mixture and greatly increases reaction rates between the treatment composition and the contaminants. On the other hand, these conditions add little or nothing in terms of cost to the treatment method because the conditions occur naturally. Similarly, the time it takes for the liquid emulsion to pass up through a well pipe and the venturi effect caused by the choke provided with a well pipe are beneficial to the efficiency and effectiveness of the present treatment method because they add nothing in terms of cost to the treatment method as these are already fixed conditions associated with extracting the liquid emulsion from the well, but assure very great contact between the treatment composition and the contaminants in the fluids, sufficient for complete remediation of the contaminants. Further, because the contaminants in the fluids are remediated simultaneous as the fluids are being extracted from the earth provides greater efficiency and reduced cost in comparison to conventional treatment methods because the extracted fluids may be directly transported to a refinery or the like once brought to the earth's surface and separated from each other without additional processing and processing time required to bring the levels of $H_2S$ and other contaminants down to acceptable levels. Such additional processing and processing time is typically required with the conventional treatment methods, e.g., for crude oil and natural gas to be transported to a refinery through a major pipeline these fluids may be required to have 5 ppm or less of $H_2S$, and there can be significant cost associated with the additional processing and processing time.

The present treatment method permits much greater efficiency particularly in relation to treatment of the natural gas because in this treatment method the gas is in liquid form and occupies much less volume than when it is gaseous form so that a given amount of the treatment composition will have much greater and more prolonged contact with the contaminants in the natural gas in comparison to conventional treatment methods for remediating contaminants in natural gas. When the natural gas is treated while it is in liquid form according to the present invention, a relatively small amount of the treatment composition which is added to and becomes intimately mixed with the liquid emulsion, including the natural gas, will have great contact with the contaminants in the natural gas liquid as the liquid emulsion including the natural gas is flowing up through a well pipe to the earth's surface over one minute or more, as well as the even greater contact with and absorption of the treatment composition into the natural gas caused by the venturi effect when the mixture of the liquid emulsion and the treatment composition passes through the choke provided in the well pipe close to the earth's surface. This greatly increased contact and prolonged between the natural gas and the treatment composition efficiently remediates the contaminants in the natural gas down to safe acceptable levels based on such contact even before the natural gas is fully extracted from the earth. Conversely, the conventionally known treatment methods for remediating contaminants in natural gas typically will treat the natural gas while it is in gaseous form after it is extracted from the earth, and typically involve bubbling the contaminated gas though a volume of a treatment composition contained in bubbling tower or the like and/or spraying fine droplets of a treatment into a contained volume or flowing stream of the natural gas. With the conventional methods, not only is the amount of contact between the treatment composition and the natural gas significantly reduced, but a contact time between the natural gas and the treatment compositions is also much less, e.g., 0.5 to 10 seconds. Correspondingly, the conventional treatment methods will generally require much more of the treatment composition to achieve a comparable remediation of the contaminants in the natural gas in comparison to the present treatment method.

Additionally, the conventional treatment methods for remediating contaminants in natural gas while the gas is in gaseous phase will typically further include pretreatment(s) of the gas to remove salts and water because salts tend to be released as precipitates which can clog up the conventional treatment systems and presence of water in the natural gas tends to reduce contact between the treatment composition and other contaminants in the gas. With the treatment system according to the present invention no pre-treatments are required. Any salts, water and solids in the treated fluids will remain in the mixture of liquid emulsion and the treatment composition as it is being extracted due to the pH of the mixture being in the range of 7.0 to 7.2. Also, if organic acids such as fulvic acid and humic acid and/or MEA are included in the treatment composition used in the method of the present invention, these compounds are helpful to prevent formation and release of precipitates and scale from the treated fluids as they are being extracted from the earth and afterwards.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

I claim:

1. A treatment method for remediating various contaminants including $H_2S$, $CO_2$, $NH_3$ and other contaminants contained in fluids being extracted from the earth comprising the steps of: preparing an aqueous based treatment composition containing water and collectively 35-55 weight percent of one or more hydroxide compounds; injecting a dosage amount of the treatment composition into contaminated fluids located in a subterranean deposit under the earth's surface such that the treatment composition mixes with the fluids deep under the earth's surface; and extracting a mixture of the contaminated fluids and the treatment composition through a well such that the treatment compositions remediates contaminants in the fluids as the mixture passes through the well to the earth's surface, wherein a dosage amount of the treatment composition is 0.010 to 10.0 ml of the aqueous based treatment composition/liter of the contaminated fluids being extracted from the subterranean deposit, wherein the contaminated fluids located in the subterranean deposit under the earth's surface are at a temperature of at least 250° F.

2. The method according to claim 1, wherein when the mixture of the contaminated fluids and the treatment composition are initially mixed together the mixture of the fluids and the treatment composition have a pH in a range of 9.0 to less than 10.00.

3. The method according to claim 1, wherein the aqueous based treatment composition containing water and collectively 45-55 weight percent of one or more hydroxide compounds.

4. The method according to claim 1, wherein the aqueous based treatment composition includes one or more of sodium hydroxide and potassium hydroxide.

5. The method according to claim 1, wherein the aqueous based treatment composition further includes 0.01-5 wt % of organic acids including at least one of fulvic acid and humic acid.

6. The method according to claim 1, wherein the aqueous based treatment composition further includes 0.5-4.0 wt % of a chelating agent.

7. The method according to claim 6, wherein the chelating agent includes EDTA.

8. The method according to claim 1, wherein the preparing step further comprises combining an organic liquid with the aqueous based treatment composition at a ratio of 5 to 40 volume % of the mixture of the aqueous based treatment composition and the organic liquid; and the injecting step involves injecting the mixture of the aqueous based treatment composition and the organic liquid into the subterranean deposit.

9. The method according to claim 8, wherein the organic liquid includes alcohols, toluene, hexane, xylene, and mixtures thereof.

10. The method according to claim 8, wherein the organic liquid includes at least one of methanol ($CH_3OH$), ethanol ($C_2H_5OH$), and n-propyl alcohol ($C_3H_2O$).

11. The method according to claim 1, wherein the injecting step involves use of a capillary-tubing injection system for injecting the dosage amount of the aqueous based treatment composition into contaminated fluids located in a subterranean deposit.

12. The method according to claim 1, wherein the preparing step further comprises combining a chemical oxidant with the aqueous based treatment composition, wherein the chemical oxidant is combined with the aqueous based treatment composition in a range of 0.1 to 10 wt % of the total weight of the treatment composition and the chemical oxidant.

13. The method according to claim 12, wherein chemical oxidant includes at least one of hydrogen peroxide ($H_2O_2$), nitric acid ($HNO_3$), sulfuric acid ($H_2SO_4$), sodium perborate ($NaBO_3 \cdot nH_2O$), a permanganate compound ($MnO_4^-$), nitrous oxide ($NO_2$), potassium nitrate ($KNO_3$), sodium bismuthate ($NaBiO_3$), hypochlorite ($ClO^-$), an aqueous solution of chlorine bleach, and compounds containing halogens.

14. The method according to claim 1, wherein the preparing step further comprises combining a metal catalyst with the aqueous based treatment composition, wherein the metal catalyst is combined with the aqueous based treatment composition in a range of a range of 0.025% to 2.0 wt % of the total weight of the treatment compositions and the metal catalyst.

15. The method according to claim 14, wherein the metal catalyst includes at least one of rhodium, platinum and palladium.

* * * * *